US012724641B2

(12) United States Patent
Emmadi et al.

(10) Patent No.: US 12,724,641 B2
(45) Date of Patent: Sep. 1, 2026

(54) METHOD AND SYSTEM FOR BATCH PROCESSING OF JOBS

(71) Applicant: Tata Consultancy Services Limited, Mumbai (IN)

(72) Inventors: Sai Charan Emmadi, Hyderabad (IN); Satya Narayana Samudrala, Pune (IN); Parag Agrawal, Pune (IN); Maitreya Natu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 460 days.

(21) Appl. No.: 18/399,931

(22) Filed: Dec. 29, 2023

(65) Prior Publication Data

US 2024/0256349 A1 Aug. 1, 2024

(30) Foreign Application Priority Data

Jan. 30, 2023 (IN) ............................. 202321005946

(51) Int. Cl.
*G06F 9/50* (2006.01)

(52) U.S. Cl.
CPC .......... *G06F 9/5038* (2013.01); *G06F 9/5044* (2013.01)

(58) Field of Classification Search
None
See application file for complete search history.

(56) References Cited

U.S. PATENT DOCUMENTS 8,555,281 B1 * 10/2013 van Dijk ............... G06F 9/4881 718/100
9,262,216 B2 * 2/2016 Bodik .................. G06F 9/4887
10,521,406 B2 12/2019 Vaishnav et al.
10,810,046 B2 10/2020 Patel et al.
10,938,673 B2 * 3/2021 Patel .................. H04L 41/5009
12,327,134 B2 * 6/2025 Shimpi ................. G06F 9/4881
2004/0194060 A1 * 9/2004 Ousterhout ........... G06F 9/5072 714/E11.2
2007/0016907 A1 * 1/2007 Benedetti ............. G06F 9/5072 718/104

(Continued)

OTHER PUBLICATIONS

Jayasinghe et al., "Improving Performance and Availability of Services Hosted on IaaS Clouds with Structural Constraint-aware Virtual Machine Placement,"(2011).

*Primary Examiner* — Hiren P Patel

(74) *Attorney, Agent, or Firm* — FINNEGAN, HENDERSON, FARABOW, GARRETT & DUNNER LLP

(57) ABSTRACT

Many of the existing approaches for grouping of jobs for processing are manual in nature, and are based on intuition. Other approaches involve modeling batches as node-edge graphs and use existing graph theory solutions such as connected components or cliques to find logical subgraphs. However, this approach isn't efficient due to the fact that there may be various constraints unique to batch systems. The disclosure herein provides a method and system for creating logical groups of jobs meeting objective function and satisfying constraints. In this method, a logical grouping of jobs is performed such that all defined constraints are satisfied. If any job is not satisfying one or more of the defined constraints, smaller components of the jobs are derived such that the smaller components satisfy the constraints. The logical groups are formed by merging the jobs and the smaller components satisfying the constraints.

15 Claims, 9 Drawing Sheets

(56) References Cited

U.S. PATENT DOCUMENTS

2010/0162245 A1* 6/2010 Plancarte .............. G06F 9/4843 718/101
2010/0251241 A1* 9/2010 Cardelli ................ G06F 9/5038 718/100
2011/0173038 A1* 7/2011 Moon ................... G06F 9/5072 705/7.12
2012/0079498 A1* 3/2012 Kim ...................... G06F 9/5066 718/104
2012/0096046 A1* 4/2012 Kucera ................... G06F 16/21 707/802
2014/0282572 A1* 9/2014 Kang .................... G06F 9/4881 718/103
2016/0147562 A1 5/2016 Ferrandiz
2019/0050262 A1* 2/2019 Patel ......................... G06F 9/46
2019/0052547 A1* 2/2019 Patel ................... H04L 41/5025
2020/0012520 A1* 1/2020 Bidkar .................. G06F 9/3838
2021/0042168 A1* 2/2021 Bakulin ................ G06F 9/5038
2022/0188148 A1* 6/2022 Zhu ....................... G06F 9/4881

* cited by examiner

METHOD AND SYSTEM FOR BATCH PROCESSING OF JOBS

PRIORITY CLAIM

This U.S. patent application claims priority under 35 U.S.C. § 119 to: Indian Patent Application No. 202321005946, filed on Jan. 30, 2023. The entire contents of the aforementioned application are incorporated herein by reference.

TECHNICAL FIELD

The disclosure herein generally relates to batch processing of jobs, and, more particularly, to a method and system for creating logical groups of jobs meeting objective function and satisfying constraints.

BACKGROUND

Batch systems in any enterprise are involved in all backend operations such as computation of net asset values in mutual fund, settlement of trades at end of day, invoice processing, and so on. Each batch may contain thousands of batch jobs and complex interdependencies between them. Each batch contains several business units which are logically created considering different business functionalities, geographies, and technology. Each business unit is further divided into business processes so that all jobs serving a single business deliverable can be tracked easily. For example, an 'Order Management' business unit contains business processes such as 'business intelligence', 'meta data refresh', 'inventory check', 'order placement', 'invoice processing', and so on. Each business process contains business deliverables and is created with logical grouping of jobs. Even after the creation of several business units, business processes, the volume, scale, and complexity make life difficult for batch managers.

Many of the existing approaches for grouping of jobs for processing are manual in nature, and are based on intuition. This makes it very difficult to track failures and delays, assess impact, and take timely corrective actions. Hence, it becomes very important to create logically independent groups of processes, so that it is easy to navigate, visualize, and analyze large complex processes, and highlight the areas that need attention.

One of the existing approaches to address this problem is to model the batches as node-edge graphs and use existing graph theory solutions such as connected components or cliques to find logical subgraphs. However, this approach isn't efficient due to the fact that there may be various constraints unique to batch systems. Bringing a range of objective functions in the mix makes the problem even more difficult to address. Some examples of the objective functions include minimizing the number of jobs that can be present in a component, or minimizing the overlap in the execution duration of two components, and so on. Often there is a conflict between different constraints and objective functions and there is no solution present to cater to all aspects.

SUMMARY

Embodiments of the present disclosure present technological improvements as solutions to one or more of the above-mentioned technical problems recognized by the inventors in conventional systems. For example, in one embodiment, A processor implemented method is provided. In this method, a plurality of input data including a) one or more precedence relationships, b) information on a plurality of business critical jobs, and c) one or more constraints are collected via one or more hardware processors. Further, one or more logically connected components associated with the plurality of input data is created, via the one or more hardware processors. Creating the one or more logically connected components involves: determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components. Further, it is determined via the one or more hardware processors, if one or more of the plurality of independent components violates at least one of the one or more constraints. Further, a plurality of smaller components satisfying the one or more constraints, associated with the at least one independent component that has been identified as violating at least one of the one or more constraints, are derived via the one or more hardware processors. Further, one or more logical groups of the plurality of smaller components and one or more of the plurality of independent components satisfying the one or more constraints are generated, via the one or more hardware processors.

In another aspect, method of deriving the plurality of smaller components in the method includes: computing a variation factor based on variation in a plurality of historical start-times and end-times of the plurality of business-critical jobs; deriving the plurality of smaller components using a domain aware trimming approach, if the computed variation factor is below a threshold of variation; and deriving the plurality of smaller components using a domain aware splitting approach, if the computed variation factor is exceeding the threshold of variation.

In another aspect, method of deriving the plurality of smaller components using the domain aware trimming approach includes: performing a domain aware graph traversal to identify a sub-component from among a plurality of subcomponents of a graph, that is leading to the violation of one or more of the one or more constraints; maximizing distance of the sub-component from a Service Level Agreement (SLA); and removing the sub-component to form one or more smaller components meeting all of the one or more constraints.

In yet another aspect, method of deriving the plurality of smaller components using the domain aware splitting approach includes: breaking each of a plurality of components to a plurality of smaller components, wherein an uptree of each of a plurality of SLA jobs is separated into a separate component; maximizing an uptree job count and duration of each of the plurality of SLA jobs while separating each of the plurality of SLA jobs into the separate component; and forming one smaller component for each of the plurality of SLA jobs.

In yet another aspect, method of generating the one or more logical groups of the plurality of smaller components includes merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

In yet another aspect, a system is provided. The system includes one or more hardware processors, a communication interface, and a memory storing a plurality of instructions. The plurality of instructions when executed, cause the one or more hardware processors to collect a plurality of input data, wherein the plurality of input data comprising a) one or more precedence relationships, b) information on a plurality of business critical jobs, and c) one or more constraints. Further, one or more logically connected components associated with the plurality of input data is created, via the one or more hardware processors. Creating the one or more logically connected components involves: determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components. Further, it is determined via the one or more hardware processors, if one or more of the plurality of independent components violates at least one of the one or more constraints. Further, a plurality of smaller components satisfying the one or more constraints, associated with the at least one independent component that has been identified as violating at least one of the one or more constraints, are derived via the one or more hardware processors. Further, one or more logical groups of the plurality of smaller components and one or more of the plurality of independent components satisfying the one or more constraints are generated, via the one or more hardware processors.

In yet another aspect, the system derives the plurality of smaller components in the method by: computing a variation factor based on variation in a plurality of historical start-times and end-times of the plurality of business-critical jobs; deriving the plurality of smaller components using a domain aware trimming approach, if the computed variation factor is below a threshold of variation; and deriving the plurality of smaller components using a domain aware splitting approach, if the computed variation factor is exceeding the threshold of variation.

In yet another aspect, the system derives the plurality of smaller components using the domain aware trimming approach, by: performing a domain aware graph traversal to identify a sub-component from among a plurality of sub-components of a graph, that is leading to the violation of one or more of the one or more constraints; maximizing distance of the sub-component from a Service Level Agreement (SLA); and removing the sub-component to form one or more smaller components meeting all of the one or more constraints.

In yet another aspect, the system derives the plurality of smaller components using the domain aware splitting approach, by: breaking each of a plurality of components to a plurality of smaller components, wherein an uptree of each of a plurality of SLA jobs is separated into a separate component; maximizing an uptree job count and duration of each of the plurality of SLA jobs while separating each of the plurality of SLA jobs into the separate component; and forming one smaller component for each of the plurality of SLA jobs.

In yet another aspect, the system generates the one or more logical groups of the plurality of smaller components by merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

In yet another aspect, a non-transitory computer readable medium is provided. The non-transitory computer readable medium includes a plurality of instructions, which when executed, causes one or more hardware processors to perform the following steps. Initially, a plurality of input data including a) one or more precedence relationships, b) information on a plurality of business critical jobs, and c) one or more constraints are collected via one or more hardware processors. Further, one or more logically connected components associated with the plurality of input data is created, via the one or more hardware processors. Creating the one or more logically connected components involves: determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components. Further, it is determined via the one or more hardware processors, if one or more of the plurality of independent components violates at least one of the one or more constraints. Further, a plurality of smaller components satisfying the one or more constraints, associated with the at least one independent component that has been identified as violating at least one of the one or more constraints, are derived via the one or more hardware processors. Further, one or more logical groups of the plurality of smaller components and one or more of the plurality of independent components satisfying the one or more constraints are generated, via the one or more hardware processors.

In yet another aspect, the non-transitory computer readable medium causes the one or more hardware processors to derive the plurality of smaller components by: computing a variation factor based on variation in a plurality of historical start-times and end-times of the plurality of business-critical jobs; deriving the plurality of smaller components using a domain aware trimming approach, if the computed variation factor is below a threshold of variation; and deriving the plurality of smaller components using a domain aware splitting approach, if the computed variation factor is exceeding the threshold of variation.

In yet another aspect, the non-transitory computer readable medium causes the one or more hardware processors to derive the plurality of smaller components using the domain aware trimming approach by: performing a domain aware graph traversal to identify a sub-component from among a plurality of subcomponents of a graph, that is leading to the violation of one or more of the one or more constraints; maximizing distance of the sub-component from a Service Level Agreement (SLA); and removing the sub-component to form one or more smaller components meeting all of the one or more constraints.

In yet another aspect, the non-transitory computer readable medium causes the one or more hardware processors to derive the plurality of smaller components using the domain aware splitting approach by: breaking each of a plurality of components to a plurality of smaller components, wherein an uptree of each of a plurality of SLA jobs is separated into a separate component; maximizing an uptree job count and duration of each of the plurality of SLA jobs while separating each of the plurality of SLA jobs into the separate component; and forming one smaller component for each of the plurality of SLA jobs.

In yet another aspect, the non-transitory computer readable medium causes the one or more hardware processors to generate the one or more logical groups of the plurality of smaller components by merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
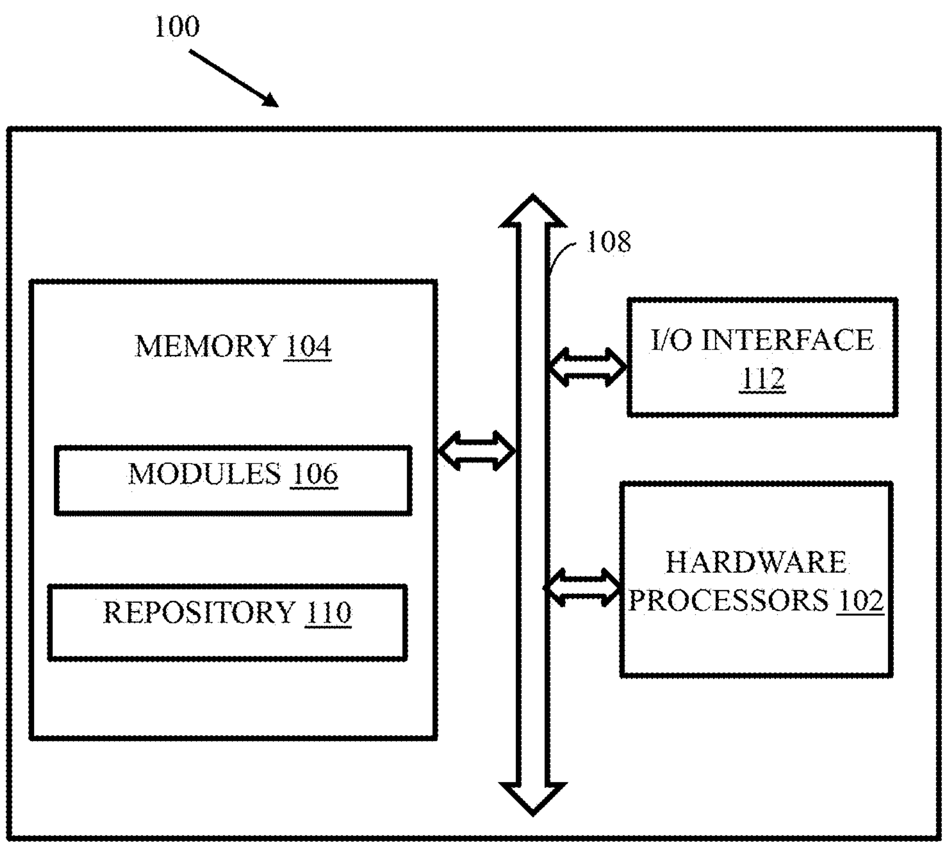
FIG. 1 illustrates an exemplary system for grouping of jobs, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Many of the existing approaches for grouping of jobs for processing are manual in nature, and are based on intuition. This makes it very difficult to track failures and delays, assess impact, and take timely corrective actions. Hence, it becomes very important to create logically independent groups of processes, so that it is easy to navigate, visualize, and analyze large complex processes, and highlight the areas that need attention. One of the existing approaches to address this problem is to model the batches as node-edge graphs and use existing graph theory solutions such as connected components or cliques to find logical subgraphs. However, this approach isn't efficient due to the fact that there may be various constraints unique to batch systems. Bringing a range of objective functions in the mix makes the problem even more difficult to address. Some examples of the objective functions include minimizing the number of jobs that can be present in a component, or minimizing the overlap in the execution duration of two components, and so on. Often there is a conflict between different constraints and objective functions and there is no solution present to cater to all aspects.

In order to address these challenges, a method and system for batch processing of jobs is provided. The method and system perform the following steps. Initially, a plurality of input data including a) one or more precedence relationships, b) information on a plurality of business critical jobs, and c) one or more constraints are collected via one or more hardware processors. Further, one or more logically connected components associated with the plurality of input data are created, via the one or more hardware processors. Creating the one or more logically connected components involves the following steps. Initially, one or more jobs that are dependent one or more of the plurality of business critical jobs are determined, from a plurality of jobs, by performing a scope derivation on the input data. Further, a plurality of independent components associated with the determined one or more jobs that are dependent on one or more of the plurality of business critical jobs are derived, wherein the plurality of independent components form the one or more logically connected components. Further, it is determined via the one or more hardware processors, if one or more of the plurality of independent components violates at least one of the one or more constraints. Further, a plurality of smaller components satisfying the one or more constraints, associated with the at least one independent component that has been identified as violating at least one of the one or more constraints, are derived via the one or more hardware processors. Further, one or more logical groups of the plurality of smaller components and one or more of the plurality of independent components satisfying the one or more constraints are generated, via the one or more hardware processors. By using this approach, grouping of the jobs is achieved, while ensuring that all constraints are satisfied.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 illustrates an exemplary system 100 for grouping of jobs, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of batch processing of jobs, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the switching between hardware accelerators for the batch processing of jobs.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2, FIG. 3, and FIG. 4.

Figure 2:
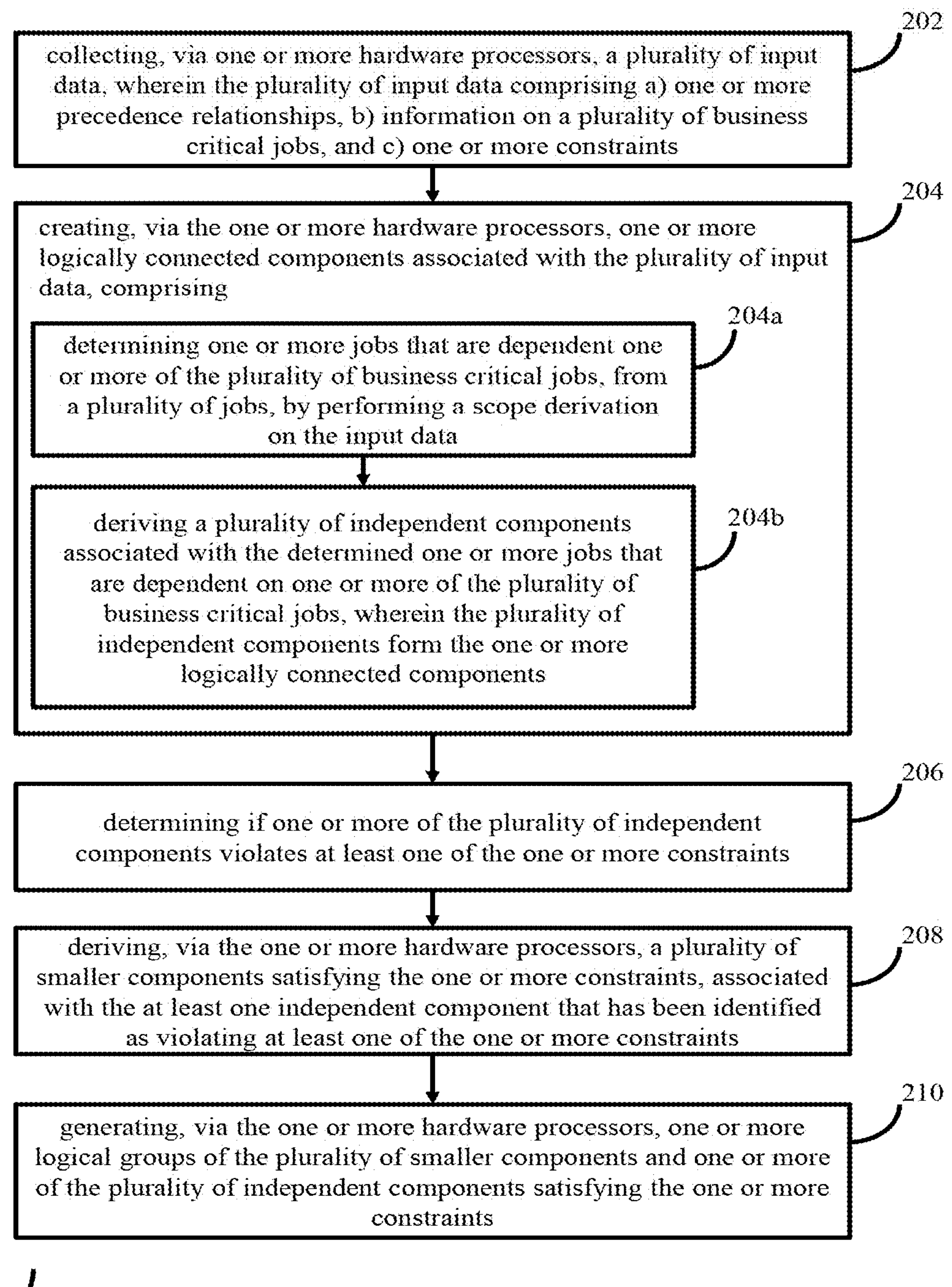
FIG. 2 is a flow diagram depicting steps involved in the process of grouping of jobs, by the system of FIG. 1, according to some embodiments of the present disclosure.
Figure 3:
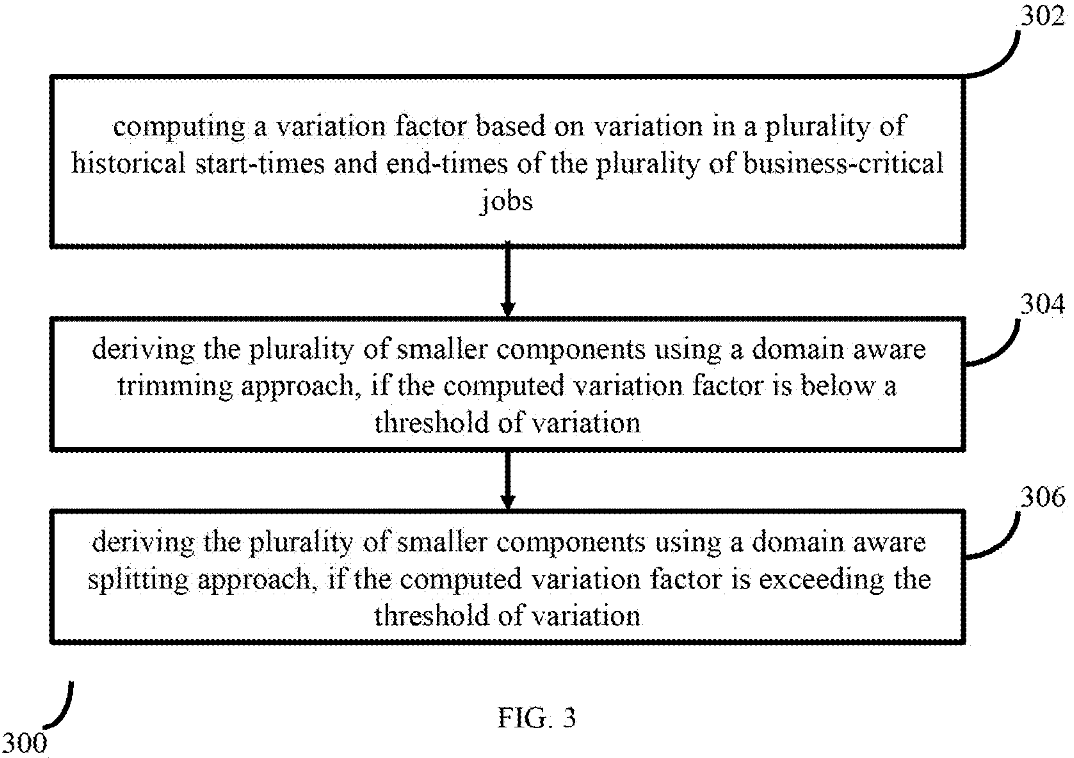
FIG. 3 is a flow diagram depicting steps involved in the process of deriving a plurality of smaller components, by the system of FIG. 1, according to some embodiments of the present disclosure.

FIG. 2 is a flow diagram of a method 200 depicting steps involved in the process of grouping of jobs, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 6A:
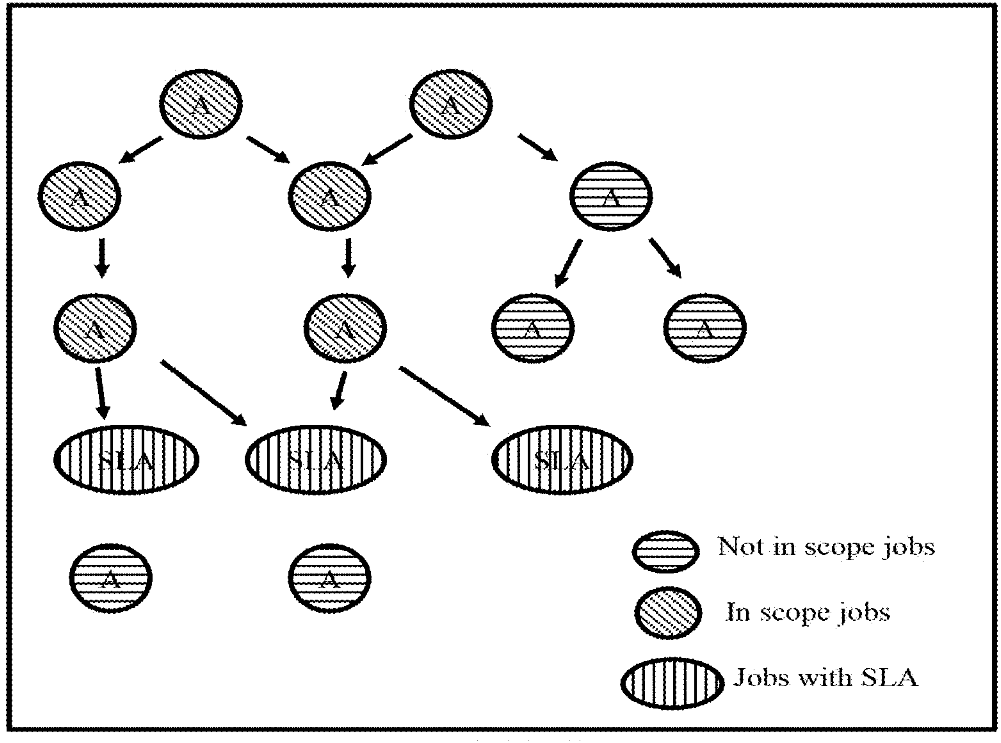
FIGS. 6A and 6B illustrate examples of scope and independent components, in a batch processing of jobs by the system of FIG. 1, according to some embodiments of the present disclosure.
Figure 6B:
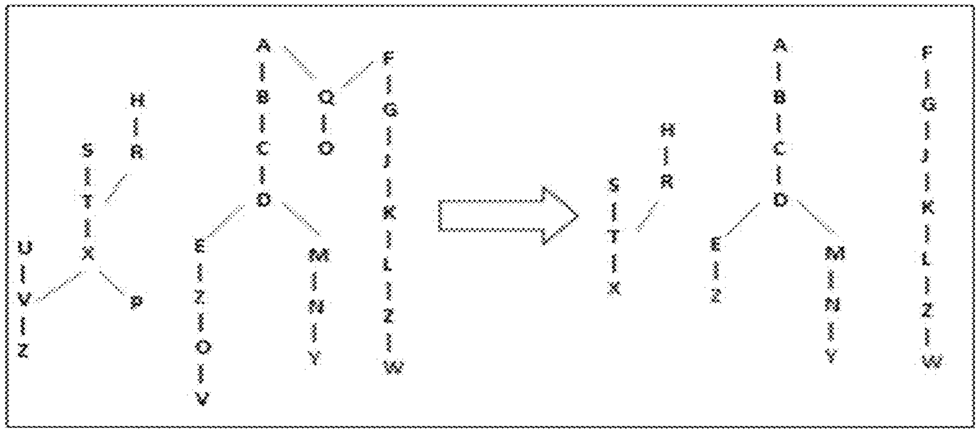

At step 202 of the method 200, the system 100 collects, via the one or more hardware processors 102, a plurality of input data including a) one or more precedence relationships, b) information on a plurality of business critical jobs, and c) one or more constraints. The system 100 may receive the input data automatically from one or more sources, which may be connected to the system 100 via one or more suitable interfaces. In another embodiment, an authorized user may feed the input data to the system 100 via a suitable interface. The one or more constraints include, but not limited to, a) number of jobs in a component, b) duration of a component, c) time zone of a components, d) maximum depth of a component e) maximum number of business-critical jobs in a component, and f) no overlap in the execution of components. The precedence relationship indicates that a particular job (a child job) can start only after a prior job (i.e. a parent job) has been executed. For example, refer to FIG. 6A, in which parent nodes and associated child nodes are depicted. The child nodes of each parent node are executed only after the associated parent node is executed. In an organizational context, some of the jobs may have an associated timeline, which is governed by Service Level Agreements (SLAs). Hence priority is given to the jobs having deadlines set by SLAs. Due to dependencies of the jobs, even though there may not be a direct SLA applicable, some of the jobs may come under scope of the SLA jobs, and some other may not come under the scope of the SLA jobs. This is depicted in FIG. 6A.

Further, at step 204 of the method 200, one or more logically connected components associated with the plurality of input data is created, via the one or more hardware processors 102. Steps involved in creating the one or more logically connected components are depicted in steps 204*a* and 204*b*. At step 204*a*, the system 100 determines one or more jobs from a plurality of jobs, that are dependent one or more of the plurality of business-critical jobs, by performing a scope derivation on the input data. Performing the scope derivation involves performing a graph traversal on the precedence relationships of the business critical jobs with other jobs to derive the scope. Further, at step 204*b*, the system 100 derives a plurality of independent components associated with the determined one or more jobs that are dependent on one or more of the plurality of business-critical jobs, wherein the plurality of independent components form the one or more logically connected components.

Further, at step 206 of the method 200, the system 100 determines via the one or more hardware processors, if one or more of the plurality of independent components violates at least one of the one or more constraints. This may be done by separately checking constraints satisfied by each of the plurality of independent components, and then determining if any constraint is not satisfied by any of the plurality of independent components. All of the plurality of independent components that are identified as satisfying the plurality of constraints are directly used to generate the logical groups in step 210 of the method 200. The independent components that are identified as not satisfying one or more of the constraints are processed at step 208 of the method 200.

At the step 208 of the method 200, the system 100 derives a plurality of smaller components satisfying the one or more constraints, associated with the at least one independent component that has been identified as violating at least one of the one or more constraints, via the one or more hardware processors 102. In an embodiment, the system 100 may perform the step of deriving the plurality of smaller components, till all the constrains are satisfied. The splitting of each of the independent components violating the one or more constraints maybe done in a plurality of iterations. After each iteration, the system 100 may check if resulting smaller components are satisfying the constraints, and if not, finer smaller components are derived from the smaller components derived in previous iteration. Steps in deriving the smaller components are depicted in method 300 in FIG. 3, and is explained hereafter.

At step 302 of the method 300, the system 100 computes a variation factor based on variation in a plurality of historical start-times and end-times of the plurality of business-critical jobs. Information on the historical start-times and end-times maybe stored in a reference database associated with the system 100, and may be updated from time to time, with information on the start-times and end-times after each execution of the business-critical jobs. The system 100 uses one of a domain aware trimming approach and a domain aware splitting approach for deriving the smaller components. To determine which of these two approaches is to be used, the system 100 compares the computed variation score with a threshold of variation. If the computed variation factor is below the threshold of variation, then the system 100 derives the plurality of smaller components using a domain aware trimming approach. If the computed variation factor is exceeding the threshold of variation, then the system 100 derives the plurality of smaller components using the domain aware splitting approach. Steps in the domain aware trimming approach and the domain aware splitting approach are explained in method 400 in FIG. 4 and method 500 in FIG. 5, respectively.

Figure 4:
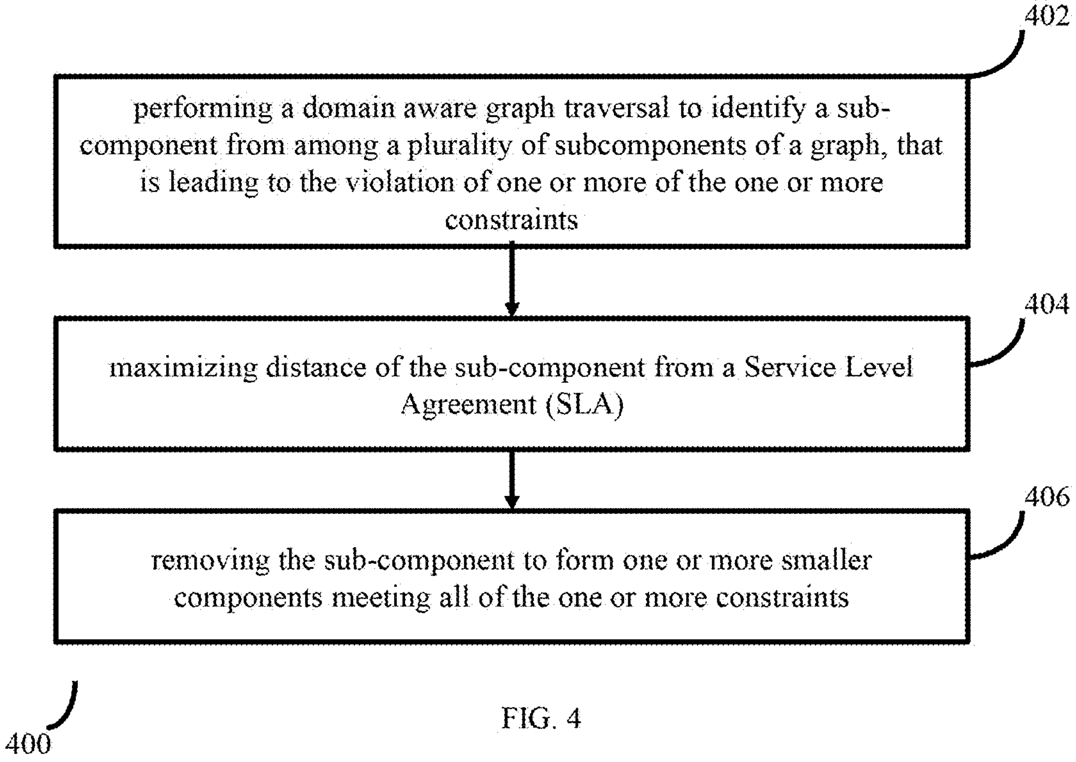
FIG. 4 is a flow diagram depicting steps involved in a domain aware trimming approach for deriving the plurality of smaller components, by the system of FIG. 1, according to some embodiments of the present disclosure.
Figure 7:
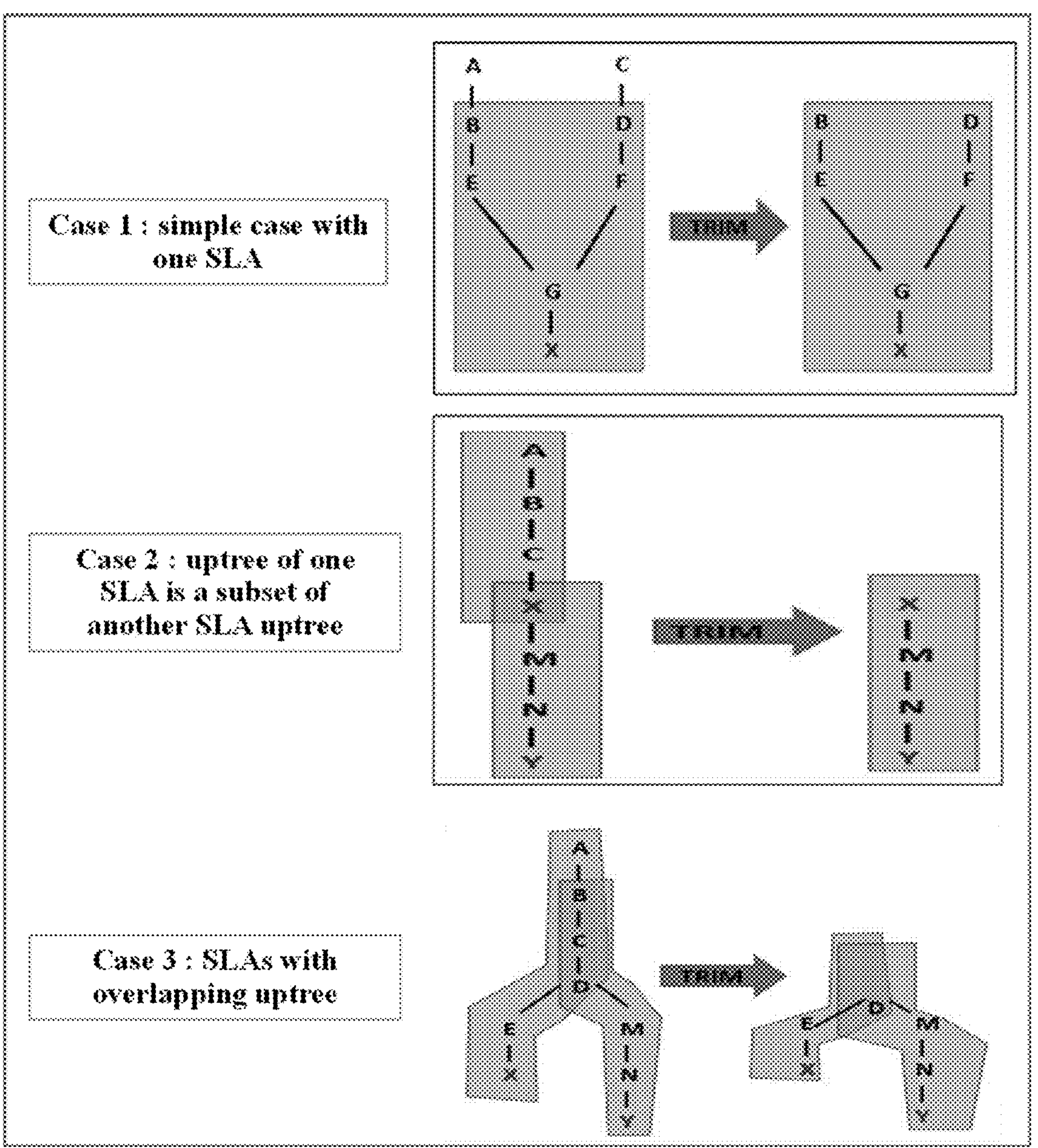
FIG. 7 illustrates example of derivation of the smaller components using the domain aware trimming approach, by the system of FIG. 1, according to some embodiments of the present disclosure.

As depicted in method 400 in FIG. 4, the method of deriving the plurality of smaller components using the domain aware trimming approach includes the following steps. At step 402 of the method 400, the system 100 performs a domain aware graph traversal to identify a sub-component from among a plurality of subcomponents of a graph, that is leading to the violation of one or more of the one or more constraints. Upon identifying all the subcomponents at step 402, further at step 404 of the method 400, the system 100 maximizes distance of the sub-component from a Service Level Agreement (SLA). Further, at step 406 of the method 400, the system 100 removes the sub-component to form one or more smaller components meeting all of the one or more constraints. As depicted in FIG. 7, there may be different possible scenarios/cases while using the domain aware trimming approach.

Figure 5:
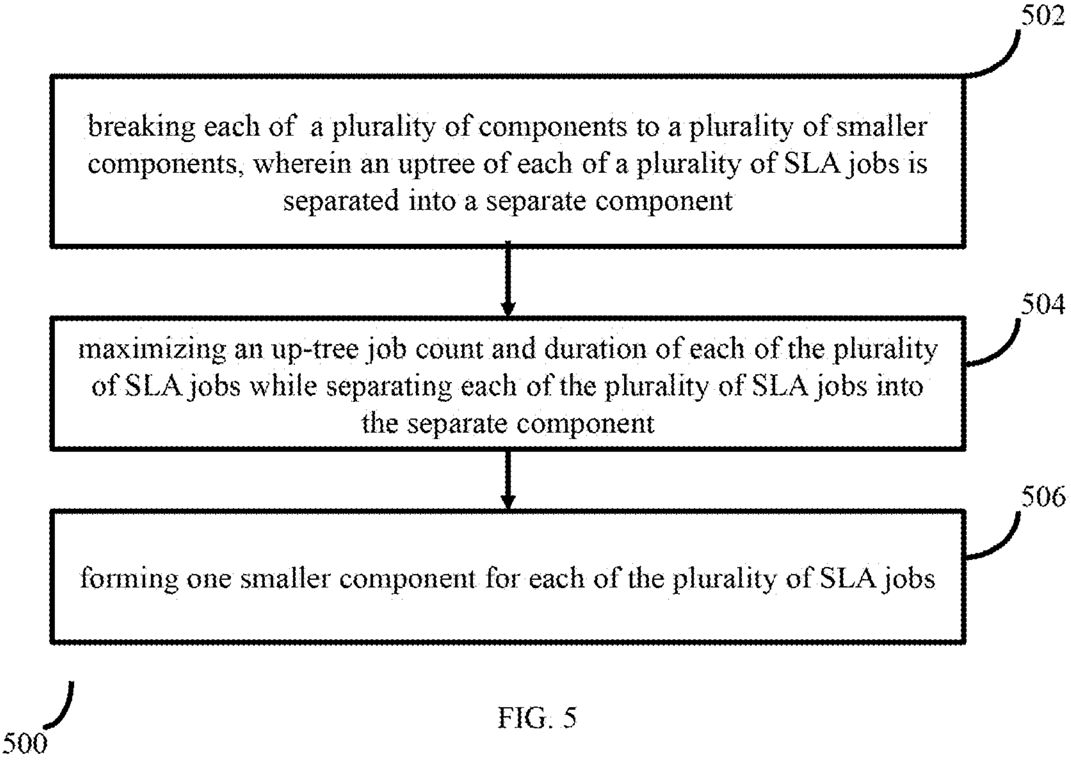
FIG. 5 is a flow diagram depicting steps involved in a domain aware splitting approach for deriving the plurality of smaller components, by the system of FIG. 1, according to some embodiments of the present disclosure.

As depicted in method 500 in FIG. 5, the method of deriving the plurality of smaller components using the domain aware splitting approach includes the following steps. At step 502 of the method 500, the system 100 breaks each of a plurality of components to a plurality of smaller components, during which, an uptree of each of a plurality of SLA jobs is separated into a separate component. Further, at step 504 of the method 500, the system 100 maximizes an uptree job count and duration of each of the plurality of SLA jobs while separating each of the plurality of SLA jobs into the separate components, thus forming one smaller component for each of the plurality of SLA jobs at step 506 of the method 500. Maximizing the uptree job count makes it easy to navigate, visualize, and understand the component with minimal loss of jobs and minimal change in the performance.

While using the domain aware splitting approach and the domain aware trimming approaches, the system 100 may have to handle different scenarios. Different such example scenarios are depicted in FIG. 7 (for the domain aware trim approach) and FIG. 8 (for the domain aware split approach).

Case 1 in FIG. 7 shows a single SLA with an independent uptree. There is one SLA job X and 7 uptree jobs A, B, C, D, E, F, G, and it does not meet the thresholds criteria. Hence, the trim approach removes jobs A and C to form a single component that meets all the constraints.

Case 2 in FIG. 7 depicts a scenario wherein uptree of one SLA is a subset of another SLA uptree. As depicted, X and Y are two SLA jobs, {A, B, C} and {A, B, C, X, M, N} are their respective uptree jobs. Even though the uptree jobs A, B, C are meeting the constraints w.r.t to the SLA X, they are not meeting the constraints w.r.t the SLA Y. Hence, the trim approach removes A, B, C to form the single trimmed component which meets both the constraints max count and max duration. As depicted, the split approach made two components {A, B, C, X} and {M, N, Y}. The split approach is fair to both SLA jobs but leads to 2 components. The trim is unfair to one SLA but provides a single component.

Case 3 in FIG. 7 depicts SLAs with overlapping uptree. This approach maintains a single component but tries to reduce the length by removing some jobs. It tries to reduce the smallest number of jobs to meet the maximum count criteria and maximum duration criteria while maximizing the length of each SLA uptree. As depicted, X and Y are two SLAs and {A, B, C, D, E} and {A, B, C, D, M, N, Y} are their respective uptree jobs. The trim approach removes jobs A, B, C to meet the max_duration and max_count constraint. The difference between the trim and split for the same approach can be seen in FIGS. 7 and 8.

An algorithmic representation of the domain aware trim approach is given below:

1. If max (end time of all SLA nodes)−min (start time of all uptree nodes)<max duration and (count of all nodes in component)<max count threshold, then return
2. Remove all nodes that are not part of any SLA node uptree
3. Check max_duration condition
    - a. For each SLA
        - i. i. compute its uptree
        - ii. For each uptree node, compute the time gap (uptree node start time−SLA job start time)
            - 1. If a node is part of uptree of more than one SLA, then time gap is max of time gaps of all SLAs
    - b. Remove all edges of uptree nodes where time gap>max duration
4. Check max_count condition
    - a. While (count of all nodes in component)>max count threshold,
        - i. Find the farthest uptree node with longest hop distance from all the SLAs
        - ii. Remove all the edges between the node and the SLA uptree component
        - iii. Update the trim component
5. Return the subgraph Similarly, the different scenarios depicted in FIG. 8 are as follows.

Figure 8:
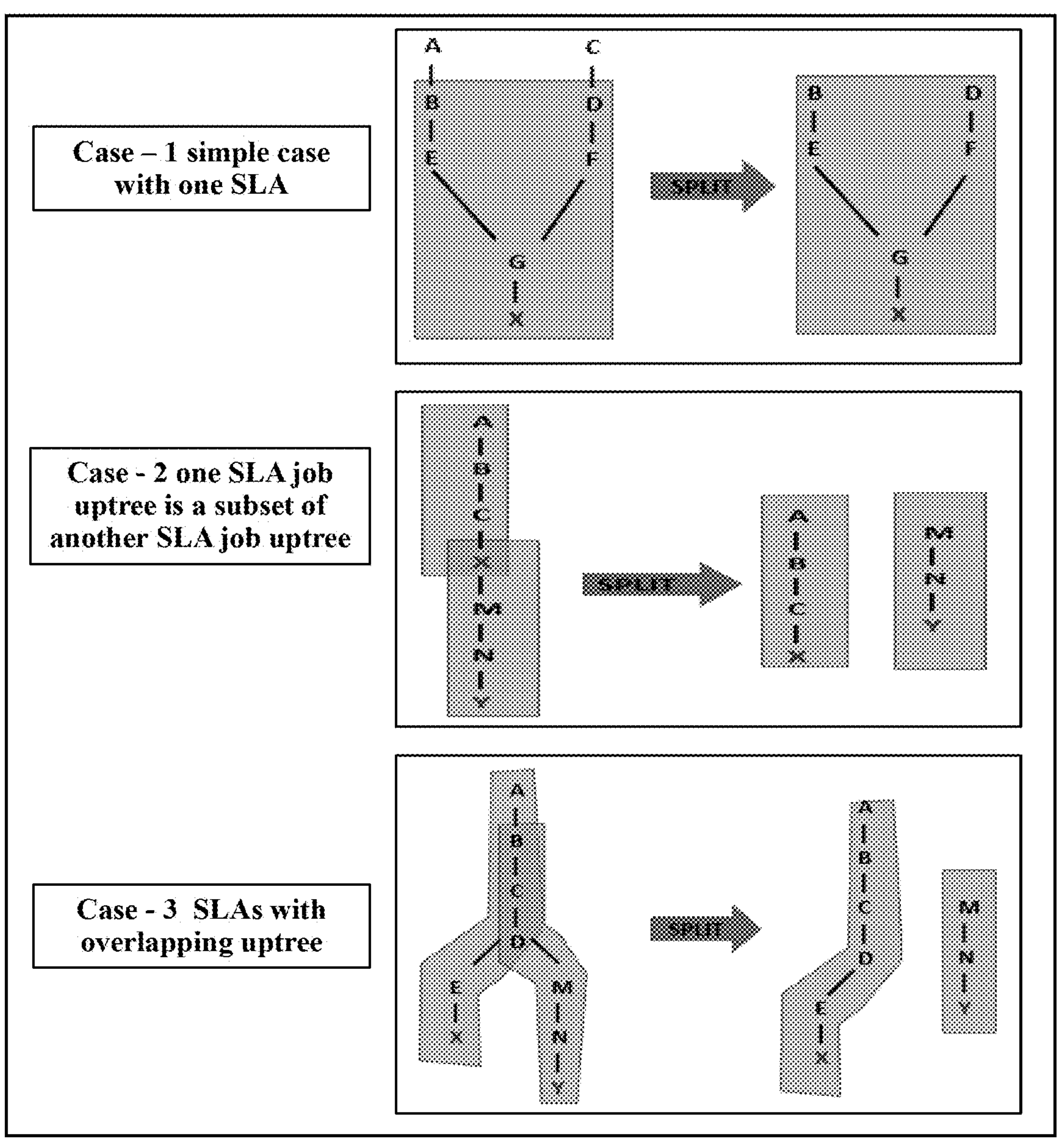
FIG. 8 illustrates example of derivation of the smaller components using the domain aware splitting approach, by the system of FIG. 1, according to some embodiments of the present disclosure.
Figure 9:
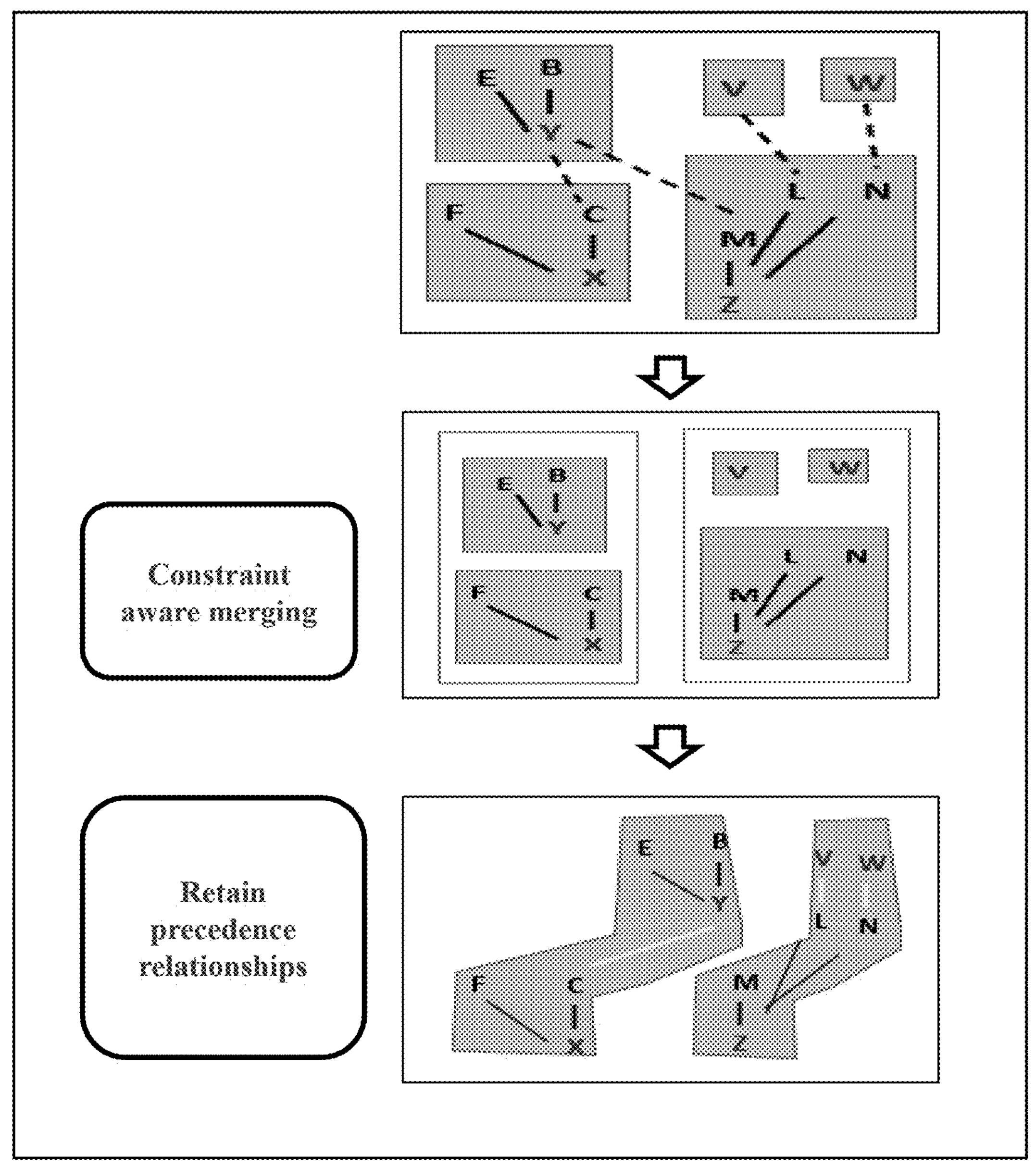
FIG. 9 illustrates example of merging of the smaller components by the system of FIG. 1, according to some embodiments of the present disclosure.

In Case 1 of FIG. 8, X is an SLA and A, B, C, D, E, F, G are associated uptree jobs. Removing processes A and C helps meet the maximum duration and the maximum count constraints while minimizing the impact on the SLA job's uptree length and duration.

In Case 2 of FIG. 8, a component has 2 SLA jobs and one SLA job uptree is a subset of another SLA job uptree. In this case, the split approach first splits to form 2 components, one for each SLA and its uptree. A, B, C, and X form one component and M, N, and Y form another component. Both the components meet the count and duration constrains, while maximizing the uptree length and duration of the SLA uptree.

In Case 3 of FIG. 8, a component has 2 SLA jobs with partially overlapping uptree. The SLAs X, Y with A, B, C, D as overlapping uptree for both X and Y. The split approach creates two components such that A, B, C, D, E, and X form one component while M, N, and Y form the second component.

An algorithmic representation of the domain aware splitting approach is given below:

1. If max (end time of all SLA nodes)−min (start time of all uptree nodes)<max duration threshold and (count of all nodes in component)<max count threshold, then return
2. Remove all nodes that are not part of any SLA node uptree
3. Check max_duration condition
    - a. For each SLA,
        - i. Compute its uptree
        - ii. Identify the edges that are connecting uptree nodes with the other SLA uptree and remove them
        - iii. For each uptree node, compute the time gap (uptree node start time−SLA node start time)
        - iv. Remove all edges of uptree nodes where time gap>max duration
4. Check max_count condition
    - a. For every split component, while (count of all nodes in component)>max count threshold,
        - i. Find the farthest uptree node with longest hop distance from the SLA
        - ii. Remove all the edges between the node and the split component
        - iii. Update the split component
5. Return the subgraph with split components Referring back to the method 200, at step 210 of the method 200, the system 100 generates the one or more logical groups of the plurality of smaller components and one or more of the plurality of independent components satisfying the one or more constraints, via the one or more hardware processors 102. In an embodiment, the system 100 merges at least a subset of the plurality of smaller components into a larger component until none of the one or more constraints is violated. At this step, all of a plurality of previously cut edges are retained while merging at least the subset of the plurality of smaller components. Also, one or more corrective actions are taken to reduce impact of deletion if one or more of the plurality of smaller components is deleted. An example of the corrective action is assigning fixed start time on a child job after deletion of edge. Subset of the plurality of smaller components remaining after the deletion of one or more of the plurality of smaller components forms the logical group of the plurality of smaller components.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of creating batch jobs for interdependent jobs. The embodiment, thus provides a method and system for creating batch jobs for interdependent jobs. Moreover, the embodiments herein further provide mechanism of generating batch jobs while satisfying defined constraints.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

collecting, via one or more hardware processors, a plurality of input data, wherein the plurality of input data further comprising a) one or more precedence relationships, b) information on a plurality of business critical jobs, and c) one or more constraints;

creating, via the one or more hardware processors, one or more logically connected components associated with the plurality of input data, further comprising:

determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components;

determining, via the one or more hardware processors, when one or more of the plurality of independent components violates at least one of the one or more constraints;

deriving, via the one or more hardware processors, a plurality of smaller components satisfying the one or more constraints, associated with the at least one independent component that has been identified as violating at least one of the one or more constraints; and generating, via the one or more hardware processors, one or more logical groups of the plurality of smaller components and one or more of the plurality of independent components satisfying the one or more constraints;

wherein deriving the plurality of smaller components comprises:

computing a variation factor based on variation in a plurality of historical start-times and end-times of the plurality of business-critical jobs;

deriving the plurality of smaller components using a domain aware trimming approach, when the computed variation factor is below a threshold of variation; and deriving the plurality of smaller components using a domain aware splitting approach, when the computed variation factor is exceeding the threshold of variation.

2. The method of claim 1, wherein deriving the plurality of smaller components using the domain aware trimming approach comprises:

performing a domain aware graph traversal to identify a sub-component from among a plurality of subcomponents of a graph, that is leading to violation of one or more of the one or more constraints;

maximizing distance of the sub-component from a Service Level Agreement (SLA); and removing the sub-component to form one or more smaller components meeting all of the one or more constraints.

3. The method of claim 1, wherein deriving the plurality of smaller components using the domain aware splitting approach comprises:

breaking each of a plurality of components to the plurality of smaller components, wherein an uptree of each of a plurality of SLA jobs is separated into a separate component;

maximizing an uptree job count and duration of each of the plurality of SLA jobs while separating each of the plurality of SLA jobs into the separate component; and forming one smaller component for each of the plurality of SLA jobs.

4. The method of claim 1, wherein generating the one or more logical groups of the plurality of smaller components comprises merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

5. The method of claim 1, wherein the one or more constraints comprises a) number of jobs in a component, b) duration of the component, c) time zone of a components, d) maximum depth of a component e) maximum number of business-critical jobs in a component, and f) no overlap in the execution of components.

6. A system, comprising:

one or more hardware processors;

a communication interface; and a memory storing a plurality of instructions, wherein the plurality of instructions when executed, cause the one or more hardware processors to:

collect a plurality of input data, wherein the plurality of input data further comprising a) one or more precedence relationships, b) information on a plurality of business critical jobs, and c) one or more constraints;

create one or more logically connected components associated with the plurality of input data, by:

determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components;

determine when one or more of the plurality of independent components violates at least one of the one or more constraints;

derive a plurality of smaller components satisfying the one or more constraints, associated with the at least one independent component that has been identified as violating at least one of the one or more constraints; and generate one or more logical groups of the plurality of smaller components and one or more of the plurality of independent components satisfying the one or more constraints;

wherein the one or more hardware processors are configured to derive the plurality of smaller components by:

computing a variation factor based on variation in a plurality of historical start-times and end-times of the plurality of business-critical jobs;

deriving the plurality of smaller components using a domain aware trimming approach, when the computed variation factor is below a threshold of variation; and deriving the plurality of smaller components using a domain aware splitting approach, when the computed variation factor is exceeding the threshold of variation.

7. The system of claim 6, wherein the one or more hardware processors are configured to derive the plurality of smaller components using the domain aware trimming approach by:

performing a domain aware graph traversal to identify a sub-component from among a plurality of subcomponents of a graph, that is leading to violation of one or more of the one or more constraints;

maximizing distance of the sub-component from a Service Level Agreement (SLA); and removing the sub-component to form one or more smaller components meeting all of the one or more constraints.

8. The system of claim 6, wherein the one or more hardware processors are configured to derive the plurality of smaller components using the domain aware splitting approach by:

breaking each of a plurality of components to the plurality of smaller components, wherein an uptree of each of a plurality of SLA jobs is separated into a separate component;

maximizing an uptree job count and duration of each of the plurality of SLA jobs while separating each of the plurality of SLA jobs into the separate component; and forming one smaller component for each of the plurality of SLA jobs.

9. The system of claim 6, wherein the one or more hardware processors are configured to generate the one or more logical groups of the plurality of smaller components by merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

10. The system of claim 6, wherein the one or more constraints comprises a) number of jobs in a component, b) duration of the component, c) time zone of a components, d) maximum depth of a component e) maximum number of business-critical jobs in a component, and f) no overlap in the execution of components.

11. One or more non-transitory machine-readable information storage mediums comprising one or more instructions which when executed by one or more hardware processors cause:

collecting a plurality of input data, wherein the plurality of input data further comprising a) one or more precedence relationships, b) information on a plurality of business critical jobs, and c) one or more constraints;

creating one or more logically connected components associated with the plurality of input data, further comprising:

determining one or more jobs that are dependent one or more of the plurality of business critical jobs, from a plurality of jobs, by performing a scope derivation on the input data; and deriving a plurality of independent components associated with the determined one or more jobs that are dependent on one or more of the plurality of business critical jobs, wherein the plurality of independent components form the one or more logically connected components;

determining when one or more of the plurality of independent components violates at least one of the one or more constraints;

deriving a plurality of smaller components satisfying the one or more constraints, associated with the at least one independent component that has been identified as violating at least one of the one or more constraints; and generating one or more logical groups of the plurality of smaller components and one or more of the plurality of independent components satisfying the one or more constraints;

wherein deriving the plurality of smaller components comprises:

computing a variation factor based on variation in a plurality of historical start-times and end-times of the plurality of business-critical jobs;

deriving the plurality of smaller components using a domain aware trimming approach, when the computed variation factor is below a threshold of variation; and deriving the plurality of smaller components using a domain aware splitting approach, when the computed variation factor is exceeding the threshold of variation.

12. The one or more non-transitory machine-readable information storage mediums of claim 11, wherein deriving the plurality of smaller components using the domain aware trimming approach comprises:

performing a domain aware graph traversal to identify a sub-component from among a plurality of subcomponents of a graph, that is leading to violation of one or more of the one or more constraints;

maximizing distance of the sub-component from a Service Level Agreement (SLA); and removing the sub-component to form one or more smaller components meeting all of the one or more constraints.

13. The one or more non-transitory machine-readable information storage mediums of claim 11, wherein deriving the plurality of smaller components using the domain aware splitting approach comprises:

breaking each of a plurality of components to the plurality of smaller components, wherein an uptree of each of a plurality of SLA jobs is separated into a separate component;

maximizing an uptree job count and duration of each of the plurality of SLA jobs while separating each of the plurality of SLA jobs into the separate component; and forming one smaller component for each of the plurality of SLA jobs.

14. The one or more non-transitory machine-readable information storage mediums of claim 11, wherein generating the one or more logical groups of the plurality of smaller components comprises merging at least a subset of the plurality of smaller components into a larger component until none of the one or more constraints is violated, wherein, all of a plurality of previously cut edges is retained while merging at least the subset of the plurality of smaller components, and one or more corrective actions are taken to reduce impact of deletion if one or more of the plurality of smaller components is deleted, wherein, the subset of the plurality of smaller components remaining after the deletion of one or more of the plurality of smaller components forms the logical group of the plurality of smaller components.

15. The one or more non-transitory machine-readable information storage mediums of claim 11, wherein the one or more constraints comprises a) number of jobs in a component, b) duration of the component, c) time zone of a components, d) maximum depth of a component e) maximum number of business-critical jobs in a component, and f) no overlap in the execution of components.

* * * * *